United States Patent [19]

Krasinski et al.

[11] Patent Number: 4,973,157
[45] Date of Patent: Nov. 27, 1990

[54] FLUID CELL FOR RAMAN LASER PROVIDING FOR FLUID FLOW ACROSS THE BEAM PATH

[75] Inventors: Jerzy S. Krasinski, Blairstown; Paul A. Papanestor, Maplewood; Donald F. Heller, Bound Brook, all of N.J.

[73] Assignee: Allied-Signal Inc., Morris Township, Morris County, N.J.

[21] Appl. No.: 348,312

[22] Filed: May 5, 1989

[51] Int. Cl.$^5$ .............................................. G01N 1/10
[52] U.S. Cl. ....................................... 356/246; 372/3; 307/426
[58] Field of Search ........................... 356/246; 372/3; 307/426

[56] References Cited

U.S. PATENT DOCUMENTS

| | | | |
|---|---|---|---|
| 3,997,272 | 12/1976 | George | 356/246 |
| 4,075,062 | 2/1978 | Shibata et al. | 356/246 |
| 4,144,464 | 3/1979 | Loree et al. | 307/426 |
| 4,194,170 | 3/1980 | Kurnit | 372/3 |
| 4,618,783 | 10/1986 | Pradere et al. | |
| 4,829,528 | 5/1989 | Band et al. | 372/3 |

OTHER PUBLICATIONS

Optics Lett., 13, 646 (1988) J. R. Ackerhalt et al., "Short—Pulse Intracavity Raman Laser".
Optics Lett., 8, 437 (1983) R. Frey et al., "High-Efficiency Pulse Compression with Intracavity Raman Oscillators".
IEEE J. Q. Electron. QE-20, 786 (1984) Frey et al., "High-Efficiency Pulse Compression with Intracavity Raman Amplifiers".
Optics Lett., 10, 460 (1984) F. de Rougemont et al., "High-Efficiency Pulse Compression with Externally Pumped Intracavity Raman Oscillators".

*Primary Examiner*—Vincent P. McGraw
*Assistant Examiner*—S. A. Turner
*Attorney, Agent, or Firm*—Gerhard H. Fuchs; Richard C. Stewart; Ernest D. Buff

[57] ABSTRACT

A cell for holding a fluid medium for passing a beam of laser radiation through it to generate Raman shifted radiation is provided with a vaned agitator designed to effect flow of the fluid within the cell across the beam path, so that there is continually provided a fresh column of the optical medium within the beam path.

9 Claims, 3 Drawing Sheets

FLUID CELL FOR RAMAN LASER PROVIDING FOR FLUID FLOW ACROSS THE BEAM PATH

CROSS-REFERENCE TO RELATED APPLICATION

This application is related to commonly assigned copending U.S. application Ser. No. 247,825 filed Sept. 22, 1988 by Band et al. for "Interlocked Ring Intracavity Raman Laser and Method for Generating Raman Shifted Laser Output", to be issued as U.S. Pat. No. 4,829,528 on May 9, 1988.

BACKGROUND OF THE INVENTION

This invention relates to improved cell structures for devices for generating Raman shifted coherent radiation.

In a more specific application, the invention provides an improved cell structure for holding a Raman medium, which may be located externally or internally of a laser cavity that generates coherent radiation at a fundamental frequency.

Because of the relatively high energy levels at which Raman shifted laser devices are operated, significant temperature gradients are set up within the Raman medium, resulting in optical distortions from thermal lensing within the medium. In pulsed operation, in particular, it would therefore be desirable to provide a fresh column of the optical medium for each pulse of coherent radiation, to avoid deterioration of the generated beam over time, and to insure consistency of performance. The improved cell of the present invention is aimed at this objective.

SUMMARY OF THE INVENTION

In its broadest aspect, the above objective is achieved by the provision of the herein described cell for holding a fluid medium (gaseous or liquid) while passing a beam of coherent (laser) radiation through it, which cell comprises: (a) a vessel for holding the fluid medium, having window means for providing an optical path for the beam of coherent radiation; (b) vaned agitator means located within the vessel, being journalled for rotation about an axis substantially parallel to the optical path and having vanes radiating from its axis of rotation, the vanes being disposed outside of said optical path and in alignment with the axis of rotation of the agitator; and (c) means for rotating the agitator means.

The means for rotating the agitator means may be located inside or outside of the cell. Usually, an electrical motor will be employed. If the fluid medium is a gas, particularly if it is a gas under pressure greater than atmospheric, it will ordinarily be desirable to have the motor located within the cell, mechanically coupled to the agitator. However, if the fluid medium is a liquid, such as, for example, liquid nitrogen, then it is desirable to have the motor located outside of the cell, to avoid contamination of the Raman medium. In that case, there is suitably provided a magnetic coupling means between the motor and the agitator, for acting though the wall of the cell to rotate the agitator. The vanes of the agitator desirably extend substantially the length of the optical path within the cell.

For operation with liquified gases, such as liquid oxygen or liquid nitrogen, the cell is desirably equipped with a cooling mantle for holding a heat exchange fluid, such as liquid nitrogen, in contact with the exterior of the cell. In such operation, it may further be advantageous to enclose the cell, with or without such cooling mantle, in a vacuum chamber.

The specific design of the vaned agitator, and its placement with respect to the optical path within the cell, make it possible to continually provide a fresh column of the optical medium for each pulse of coherent radiation, thereby avoiding distortions which may result from more turbulent fluid circulation within the cell as would be obtained from use of other means of agitation, such as propellers or pumps.

BRIEF DESCRIPTION OF THE DRAWINGS

Having briefly summarized the essential aspects of the present invention, the same will become better understood when read in conjunction with the following detailed discussion taken with reference to the attached drawings, wherein.

DETAILED DESCRIPTION OF THE INVENTION, OF THE PREFERRED EMBODIMENTS, AND OF THE BEST MODE PRESENTLY CONTEMPLATED FOR ITS PRACTICE

Figure 1:
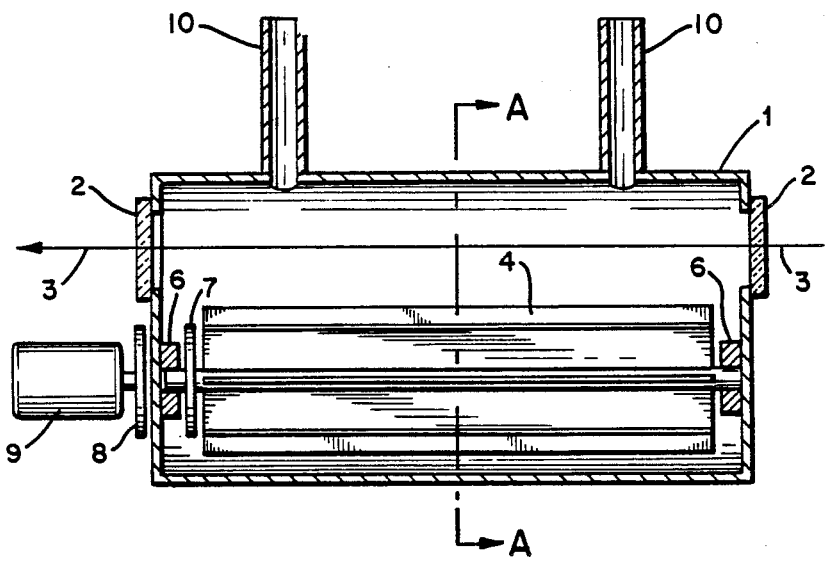
FIG. 1 is a schematic representation in partial cross-section of a Raman cell in accordance with the invention having a motor located outside of the cell, which is coupled to the agitator by means of a magnetic coupling acting through the wall of the cell.

Referring particularly to FIG. 1, the Raman cell of the present invention is made up of a vessel (1) for holding a fluid medium (not shown), which is equipped with a pair of oppositely disposed windows (2) for providing an optical path (3) for a beam of coherent radiation. Within vessel (1), but outside of the optical path (3), there is located a vaned agitator (4). the vaned agitator (4) should be located outside of the optical path so as not to interfere with the beam of coherent radiation which is passed through the vessel. However, it is to be understood that in pulsed operation it is possible to let the vanes pass through the optical path, and to coordinate pulse timing and agitator rotation in such manner that the pulsed beam passes within the gaps between the advancing vanes. Vaned agitator (4) has a shaft (5), which is journalled in journal blocks (6) located at opposite sides of vessel (1). Shaft (5) is arranged substantially parallel to optical path (3). By "arranged substantially parallel" is meant any arrangement that would permit flow of the fluid in a direction across the optical path. Usually, this will require substantial parallelism between shaft (5) and optical path (3). The vaned agitator may also be described as a paddle wheel agitator. Desirably, although not necessarily, the vanes of the agitator (which may also be referred to as paddles), are equally spaced angularly about the agitator's axis of rotation. The vanes radiate from and are in alignment with the agitator's axis of rotation. Preferably, the agitator has at least two vanes.

When operating with a liquid fluid medium, then the vaned agitator (4) is desirably rotated by means of a motor located outside of cell vessel (1). This avoids the need for passing the agitator's shaft though the vessel wall, thereby avoiding the need for a sealing arrangement, such as a packing or stuffing box. Such sealing arrangements would require use of sealants and/or lubricants, which would unavoidably contaminate the fluid within the cell. Such contamination is intolerable. As is illustratively shown in greater detail in FIG. 4, vaned agitator (4) is coupled to a motor (9), by means of a magnetic coupling comprising driven member (7) and driving member (8). These can be magnetic discs, rods, current driven coils or similar means for generating a rotating magnetic field, and for imparting the rotating field motion to the vaned agitator. Driven member (7) is mounted on shaft (5) of vaned agitator (4), and is located near the wall of vessel (1). Driven member (7) couples to driving member (8) throught wall of vessel (1). Rotation of driving member (8) by means of motor (9) imparts rotating motion to vaned agitator (4), which then "swirls" the fluid within vessel (1) in a stream across optical path (3), as is indicated by arrows in FIG. 3, thereby continually providing fresh fluid medium to the light beam along its path through the cell, whereby optical distortions which would otherwise result from thermal gradients within the fluid are critically minimized or entirely avoided. Velocity of fluid flow within the cell laterally across the beam path is governed by the speed of rotation of the agitator, at any given agitator diameter. Fluid flow velocity across the optical beam path in pulsed operation to accomplish presentation of a fresh column of fluid for each pulse requires that the fluid advances, at pulse gap intervals, at a distance at least as great as, and desirably greater than the diameter of the light beam. Of course, the use of the present cell is not limited to pulsed operation; it is also useful for cw operation, with similarly good results. Fluid is introduced into cell (1)—and replenished or exchanged during operation, as may be necessary or desirable—by means of inlet and outlet ports (10).

Figure 2:
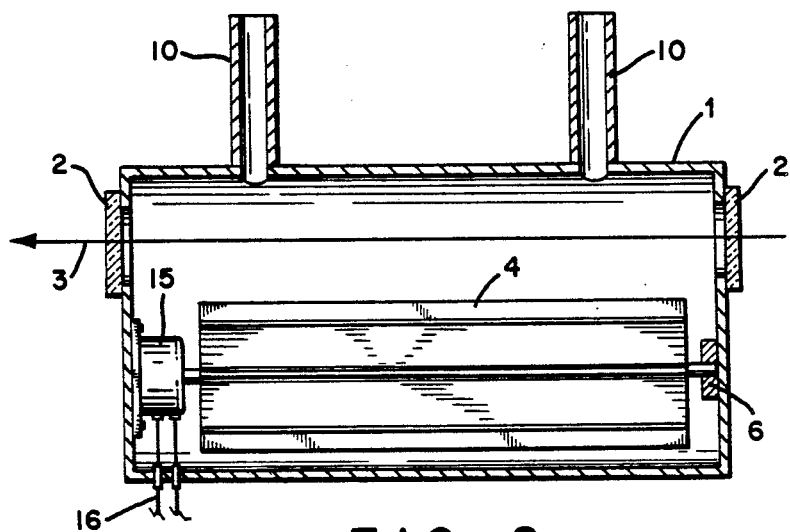
FIG. 2 is a schematic representation in partial cross-section of a Raman cell in accordance with the invention, having the motor driving the agitator located within the cell.

FIG. 2 illustrates another embodiment of the invention cell having a motor drive (15) located within the cell. Electrical connections are made by means of feedthrough (16). such an embodiment is eminently suitable for use with compressed gases. Otherwise, the operation of the cell of FIG. 2 is as above described with reference to FIG. 1.

Details of construction and operation of the cell are within the skills of the ordinary worker in the field. Materials of construction are conventional.

The fluid in the cell may be any gas or liquid capable of providing Raman shifting of coherent radiation. Exemplary gases include nitrogen, oxygen, hydrogen, carbon monoxide, nitrogen monoxide, carbon dioxide, dinitrogen monoxide, sulfur dioxide, hydrogen sulfide, ammonia, methane, ethane, propane, and the like. Suitable liquids include liquid nitrogen and oxygen, benzene, chlorobenzene, bromobenzene, nitrobenzene, toluene, carbon disulfide, carbon tetrachloride, and others will known to those skilled in the art.

Liquid nitrogen is a particularly desirable liquid for generating Raman shifted coherent radiation using the improved, internally agitated cell of the present invention. For operation at liquid nitrogen temperatures, the cell design illustrated in FIG. 5 is particularly advantageous, as will become apparent from the following description.

Figure 3:
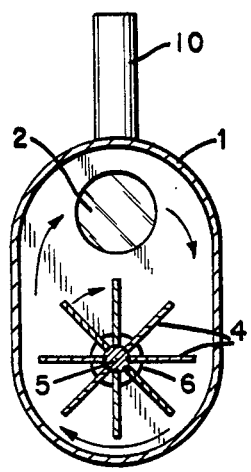
FIG. 3 is a schematic cross-sectional view of the Raman cell of FIG. 1, taken in direction A—A indicated in FIG. 1.
Figure 4:
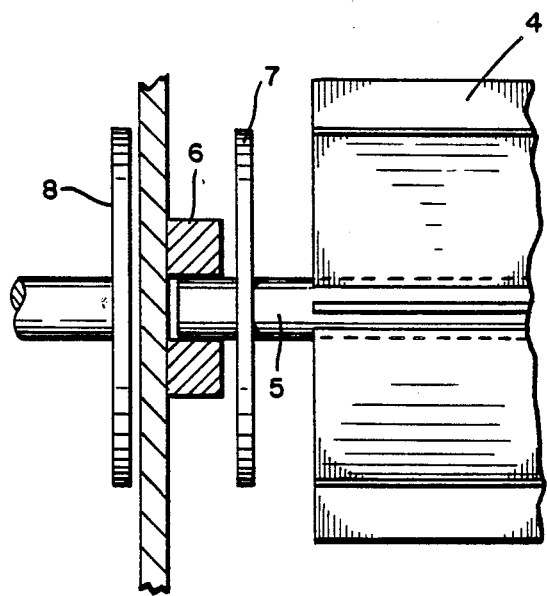
FIG. 4 is a fractional, enlarged schematic view of the magnetic coupling arrangement illustrated in FIG. 1.
Figure 5:
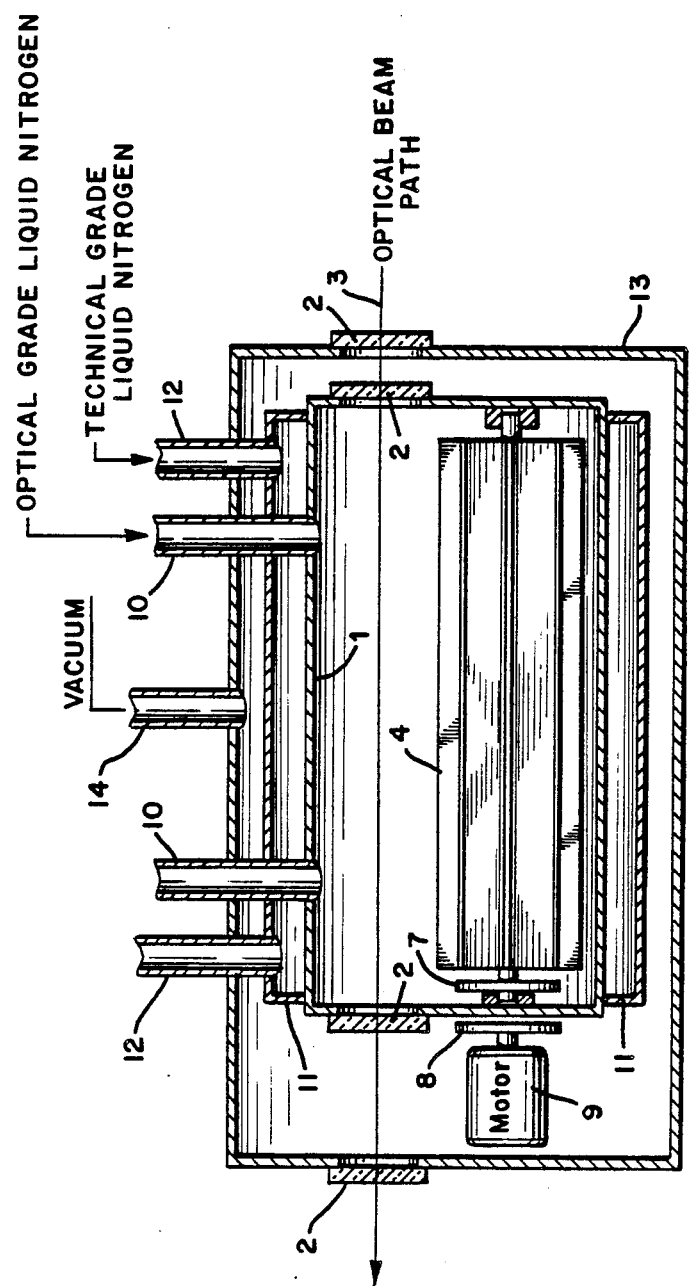
FIG. 5 is a schematic representation in partial cross-section of a preferred embodiment of a Raman cell of the present invention for producing Raman-shifted output from a liquid nitrogen Raman medium.

With reference to FIG. 5, the apparatus includes vessel (1), having a pair of oppositely disposed windows (2), the vaned agitator (4) with its shaft (5) journalled in journal blocks (6), and the magnetically coupled means for rotating agitator (4), which includes members (7) through (9), all constructe and functioning as described, above, with reference to FIGS. 1, 3 and 4. Vessel (1) is filled with optical grade liquid nitrogen through ports (10). Vessel (1) is surrounded by cooling mantle (11) for holding technical grade liquid nitrogen, which is introduced into mantle (11) by means of ports (12). In operation, the liquid nitrogen in mantle (11) is permitted to boil off, thereby providing cooling to the fluid in inner vessel (1). As the technical liquid nitrogen boils off, it is replenished. The whole apparatus can be further insulated against external heating by enclosing it in an optional evacuated enclosure (13) equipped with windows 2 which match up with those of vessel (1). To effect evacuation, a nipple (14) is suitable provided and connected to a vacuum pump (not shown).

The apparatus of this invention is, for example, advantageously employed in the interlocked ring intracavity Raman laser described and claimed in U.S. Pat. No. 4,829,528; it provides similar advantages in any other device for Raman shifting coherent radiation.

Since various changes may be made in the invention without departing from its spirit and essential characteristics, it is intended that all matter contained in the description shall be interpreted as illustrative only and not in a limiting sense, the scope of the invention being defined by the appended claims.

We claim:

1. A cell for holding a fluid medium while passing a beam of coherent radiation through said fluid medium, to generate a beam of Raman shifted radiation comprising, in combination:
    (a) a vessel for holding said fluid medium, having window means for providing an optical path for said beam of coherent radiation;
    (b) vaned agitator means located within said vessel, said agitator means being journalled for rotation about an axis substantially parallel to said optical path, and having vanes radiation from its axis of rotation, said vanes being disposed outside of said optical path and in alignment with said axis of rotation; and
    (c) means for rotating said agitator means.

2. The cell of claim 1 wherein the window means comprises a pair of windows located in oppositely disposed walls of said cell.

3. The cell of claim 1 wherein said means for rotating said agitator means comprise a motor located outside of said cell, and which further comprises magnetic coupling means associated with said motor means and said agitator means, for acting through the wall of said cell to rotate said agitator means.

4. The cell of claim 1 wherein said means for rotating said agitator means comprise a motor located within said cell.

5. The cell of claim 3 enclosed in a vacuum chamber.

6. The cell of claim 3 further comprising a mantle for holding a heat exchange fluid in contact with the exterior of said cell.

7. The cell of claim 6 enclosed in a vacuum chamber.

8. The cell of claim 7 wherein the vacuum chamber has windows in optical alignment with those of the cell.

9. The cell of claim 8 wherein said vaned agitator means extends substantially the length of said optical path within the cell.

* * * * *